(12) United States Patent
Gutierrez et al.

(10) Patent No.: US 6,367,786 B1
(45) Date of Patent: Apr. 9, 2002

(54) MICROMACHINED DOUBLE RESONATOR

(75) Inventors: Roman Gutierrez, La Crescenta; Tony K. Tang, Glendale; Kirill Shcheglov, Los Angeles, all of CA (US)

(73) Assignee: California Institute of Technology, Pasadena, CA (US)

( * ) Notice: Subject to any disclaimer, the term of this patent is extended or adjusted under 35 U.S.C. 154(b) by 0 days.

(21) Appl. No.: 09/588,878

(22) Filed: Jun. 6, 2000

Related U.S. Application Data

(60) Provisional application No. 60/138,106, filed on Jun. 7, 1999.

(51) Int. Cl.[7] .............................................. G01C 19/00
(52) U.S. Cl. ..................... 267/136; 188/378; 73/514.32
(58) Field of Search .................. 188/378–380; 267/136, 158; 248/550; 73/504.12, 514.38, 1.38, 514.29, 504.14, 514.32, 488, 504.02, 504.06; 310/320; 333/191, 158; 257/688, 718, 719, 727; 331/154; 363/33

(56) References Cited

U.S. PATENT DOCUMENTS

| | | | |
|---|---|---|---|
| 4,699,006 A | | 10/1987 | Boxenhorn .................... 73/517 |
| 4,945,765 A | * | 8/1990 | Roszhart |
| 5,211,051 A | * | 5/1993 | Kaiser et al. |
| 5,349,855 A | * | 9/1994 | Bernstein et al. |
| 5,447,067 A | * | 9/1995 | Biebl et al. ............... 73/514.32 |
| 5,652,384 A | * | 7/1997 | Henrion et al. ........... 73/514.24 |
| 5,712,427 A | | 1/1998 | Matthews ................. 73/504.04 |
| 5,894,090 A | | 4/1999 | Tang et al. ............... 73/504.02 |
| 5,896,090 A | * | 4/1999 | Tang et al. ............... 73/514.32 |
| 5,914,553 A | * | 6/1999 | Adams et al. ............... 310/309 |
| 5,992,233 A | * | 11/1999 | Clark ....................... 73/514.32 |
| 6,058,027 A | * | 5/2000 | Vargha et al. |
| 6,067,858 A | * | 5/2000 | Clark et al. |
| 6,079,272 A | | 6/2000 | Stell et al. ............... 73/504.12 |
| 6,085,594 A | | 7/2000 | Gutierrez et al. ............. 73/704 |
| 6,109,114 A | * | 8/2000 | Hartley et al. .............. 310/311 |
| 6,196,067 B1 | * | 3/2001 | Martin et al. ............ 73/514.32 |
| 6,219,145 B1 | | 4/2001 | Gutierrez et al. ........... 356/498 |
| 6,230,566 B1 | * | 5/2001 | Lee et al. ................ 73/514.32 |
| 6,236,005 B1 | * | 5/2001 | Kvisteroey et al. |
| 6,250,156 B1 | * | 6/2001 | Seshia et al. ............ 73/504.12 |
| 6,286,369 B1 | * | 9/2001 | Yazdi et al. |

FOREIGN PATENT DOCUMENTS

| | | | |
|---|---|---|---|
| EP | 0691542 | * | 1/1996 |
| WO | 9519571 | * | 7/1995 |
| WO | 9745702 | * | 12/1997 |

OTHER PUBLICATIONS

Juneau, T., Micromachined Dual Input Axis Angular Rate Sensor, 3 pages.

* cited by examiner

*Primary Examiner*—Douglas C. Butler
(74) *Attorney, Agent, or Firm*—Christie, Parker & Hale, LLP

(57) ABSTRACT

A micromachined resonator mountable to an external support structure has a proof mass coupled to a base structure by a first spring structure, the base structure having a plurality of electrodes, and a second spring structure coupling the base structure to the external support structure.

12 Claims, 8 Drawing Sheets

MICROMACHINED DOUBLE RESONATOR

REFERENCE TO RELATED APPLICATION

This application claims the benefit of U.S. Provisional Application No. 60/138,106, filed Jun. 7, 1999, the contents of which are incorporated herein by reference.

STATEMENT AS TO FEDERALLY SPONSORED RESEARCH

The invention described herein was made in the performance of work under a NASA contract, and is subject to the provisions of Public Law 96-517 (35 U.S.C. 202) in which the Contractor has elected to retain title.

FIELD OF THE INVENTION

The invention relates to systems for isolating resonating structures, and more particularly to a system for isolating a micromachined resonator.

BACKGROUND OF THE INVENTION

Micromachined resonators are useful for creating light, compact, inexpensive, and durable inertial measurement systems, such as gyroscopes and accelerometers. Micromachined resonators are also finding broader application in other equipment dependent on a sustainable vibration rate, such as clocks. Because of their small size and light weight, micromachined resonators are particularly suitable for aerospace and outer space applications and it is anticipated that the use of micromachined resonators will expand.

As with other real world oscillating systems, micromachined resonators invariably experience some energy loss due to damping. For purposes of analysis, designers of micromachined resonators have traditionally assumed that the proof mass ($m_1$) of an instrument was connected by a spring ($k_1$) to a fixed, infinite mass, as shown schematically in FIG. 8A. A peripheral frame of the resonator, attached to a larger base was considered to be fixed because the base was attached to a much larger mass. The equation of motion for a system in which a mass is connected through a spring to an infinite mass is:

$$m_1 \ddot{x}_1 + \gamma_1 \dot{x}_1 + k_1 x_1 = D_1 e^{j\omega t} \quad (1)$$

where $m_1$ is the mass, $\gamma_1$ is the damping factor, and $k_1$ is the spring constant. When solved for the Q (quality) factor of the system, the above equation yields the following solution:

$$Q = m_1/\gamma \quad (2)$$

Applicants realized upon experimentation, however, that the Q they measured did not correspond to that predicted by the above equation, indicating that the vibratory system was not as simple as previously thought. Although the frame was rigidly attached to the base, the connection between the base and the much larger mass was not entirely rigid. Thus, the proper model was not that of a single oscillating mass, but rather two separate masses and two springs as illustrated in FIG. 8B. The behavior of such a system is expressed as two simultaneous equations of motion, as follows:

$$m_1\ddot{x}_1 + k_1(x_1 - x_2) = D_1 e^{j\omega t}; \text{ and} \quad (3)$$

$$m_2\ddot{x}_2 + k_1(x_2 - x_1) + k_2 x_2 + \gamma_2 \dot{x}_2 = -D_1 e^{j\omega t} \quad (4)$$

where $m_1$ is the proof mass, $m_2$ is the combined mass of the peripheral frame and the base, $k_1$ is the spring constant of the spring system connecting the proof mass to the base, and $k_2$ is constant of the spring-like system connecting the base to the fixed mass. When solved, the above two equations yield:

$$Q = \frac{(k_2 - m_2\omega^2)^2 + \gamma_2^2\omega^2}{2\gamma_2 m_1 \pi \omega^3} \quad (5)$$

Thus, traditional methods of mounting the base of a resonator to a fixed mass, such as by glue or solder, behave like a relatively stiff (high $k_2$) "second spring," leading to a low Q factor. More importantly, the characteristics of this effective spring cannot be accurately controlled, precluding optimization of system parameters to maximize the Q factor of the resonator. As shown in the solid-line curve of FIG. 9., which is a plot of Q vs. $\gamma_2$ for a typical two mass system, Q can be as low as 290, depending on the value of $\gamma_2$.

Additionally, prior art systems are vulnerable to vibration and temperature fluctuations, due largely to the nature of the connection between the base and the fixed mass to which it is mounted. Temperature changes, due to conduction across this connection can cause the micromachined semiconductor resonator to alter its shape and thus decrease the accuracy of the device.

SUMMARY OF THE INVENTION

The resonator of the invention addresses these problems by mounting the base to the fixed mass using a third spring system and thus mounting the base to the fixed mass through a relatively compliant isolation spring system of low spring constant ($k_2$) and low damping ($\gamma_2$). This results in an effective three-mass system illustrated schematically in FIG. 8C, where the relatively stiff connection ($k_3\gamma_3$) to the fixed mass is isolated from the motion of the resonator by the isolation spring system. The effect of the stiff mounting to the fixed mass is therefore minimized, greatly increasing the Q of the resonant system. The isolation spring system also enhances controllability of the Q through system design because the dominant spring characteristics, which are those of the first and second spring systems, can be accurately controlled.

Thus, a micromachined resonator constructed according to one embodiment of the invention includes a proof mass suspended by a first spring structure. The first spring structure is attached to a base structure which has a plurality of electrodes. The base structure is coupled to an external support structure by a second spring system that serves as a spring isolation system.

In one embodiment of the invention, the second spring structure includes at least one micromachined spring, although in alternative embodiments, a membrane can be substituted for the at least one micromachined spring. The number of micromachined springs and the attachment points of each micromachined spring is variable to control the rigidity, damping and balance of the isolation system. In an embodiment of the invention, the second spring structure contains two micromachined springs positioned on opposing locations of the base structure that couple the base structure to the external support structure.

In an alternative embodiment of the invention, the base structure has a rectangular frame, and the second spring structure has two micromachined springs coupling adjacent sides of the base structure to the external support structure. In another alternative embodiment of the invention, the base structure is a rectangular frame and the second spring structure has at least four micromachined springs coupling each of the four sides of the base structure to the external support structure. In yet another alternative embodiment of the invention, the second spring structure has one micromachined spring coupling the base structure to the external support structure.

Additionally, there may be two or more micromachined spring elements in parallel coupling a point on the base structure to a point on the external support structure. In one embodiment of the invention, the second spring structure comprises four sets of two micromachined spring elements substantially parallel to each other coupling the base structure to the external support structure. In an alternative embodiment, the second spring structure comprises four sets of four micromachined spring elements substantially parallel to each other coupling the base structure to the external support structure.

The length and shape of the each micromachined spring is variable to control the rigidity and damping of the isolation system. In one embodiment, the base structure is rectangular, and the second spring structure comprises four micromachined springs. Each micromachined spring is positioned from a corner of the base structure, around three sides of the base structure, to the external support structure.

The resonator with the spring isolation system can be used in many types of inertial measurement systems, such as gyroscopes and accelerometers. In one embodiment of the present invention, the base structure has drive circuitry for exciting a mode of the proof mass having a mode shape, bias circuitry for supplying a voltage to modify the mode shape, sensing circuitry for measuring acceleration by detecting a change of the mode shape of the proof mass; and output circuitry for outputting a signal indicating the acceleration. In an alternative embodiment, the base structure has sensing circuitry for measuring rotation by detecting a change of the mode shape of the proof mass; and output circuitry for outputting a signal indicating the rotation. In one embodiment of the invention, the supply of electricity to the circuitry in the base structure takes place through lead wires coupled to at least one micromachined spring of the second spring structure.

In an additional embodiment of the present invention, there is at least one additional structure coupled to the base structure, the second spring system coupling the at least one additional structure to the external support structure. In yet another additional embodiment, the second base is coupled by the second spring system to a third base. The third base is coupled to the external support structure by a third spring system functioning as an additional spring isolation system A more complete understanding of the present invention can be obtained from the following detailed description and the accompanying drawings.

DETAILED DESCRIPTION

Although detailed illustrative embodiments are disclosed, other suitable structures and machines for practicing the invention may be employed and will be apparent to persons of ordinary skill in the art. Consequently, specific structural and functional details disclosed herein are representative only; they merely describe exemplary embodiments of the invention.

Figure 1:
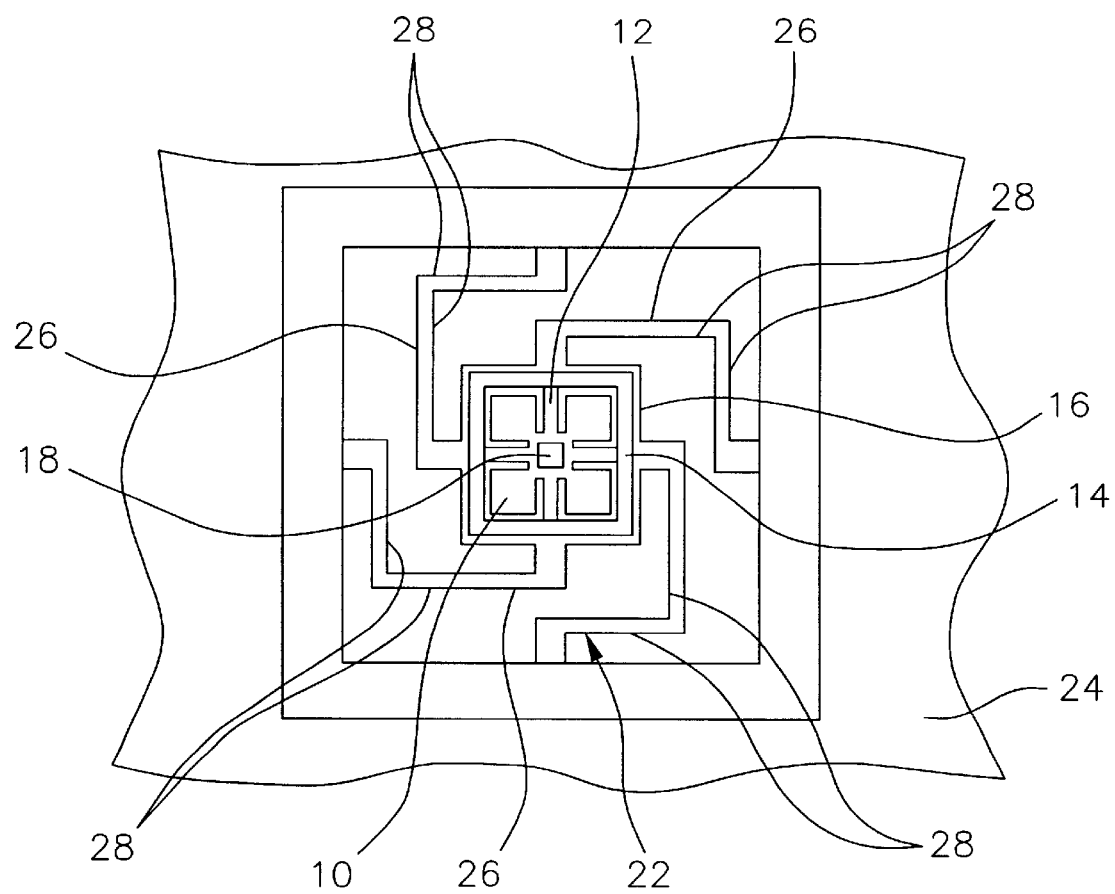
FIG. 1 is a top plan view of a resonator having a spring isolation system according to an embodiment of the present invention.

In one embodiment of the present invention, as shown in FIG. 1, the system has a proof mass 10 supported by springs 12 connected to a rim 14. The rim 14 is attached to a base plate 16 by a post 18. The base plate 16, in turn, is attached to an anchoring base 20 by an isolation system 22, and the anchoring base 20 is anchored, by adhesive solder or other suitable means, to a fixed external support structure 24. The spring isolation system 22 of FIG. 1 has four separate spring elements 26 respectively connected to four sides of the base place 16, and formed integrally therewith.

Figure 2:
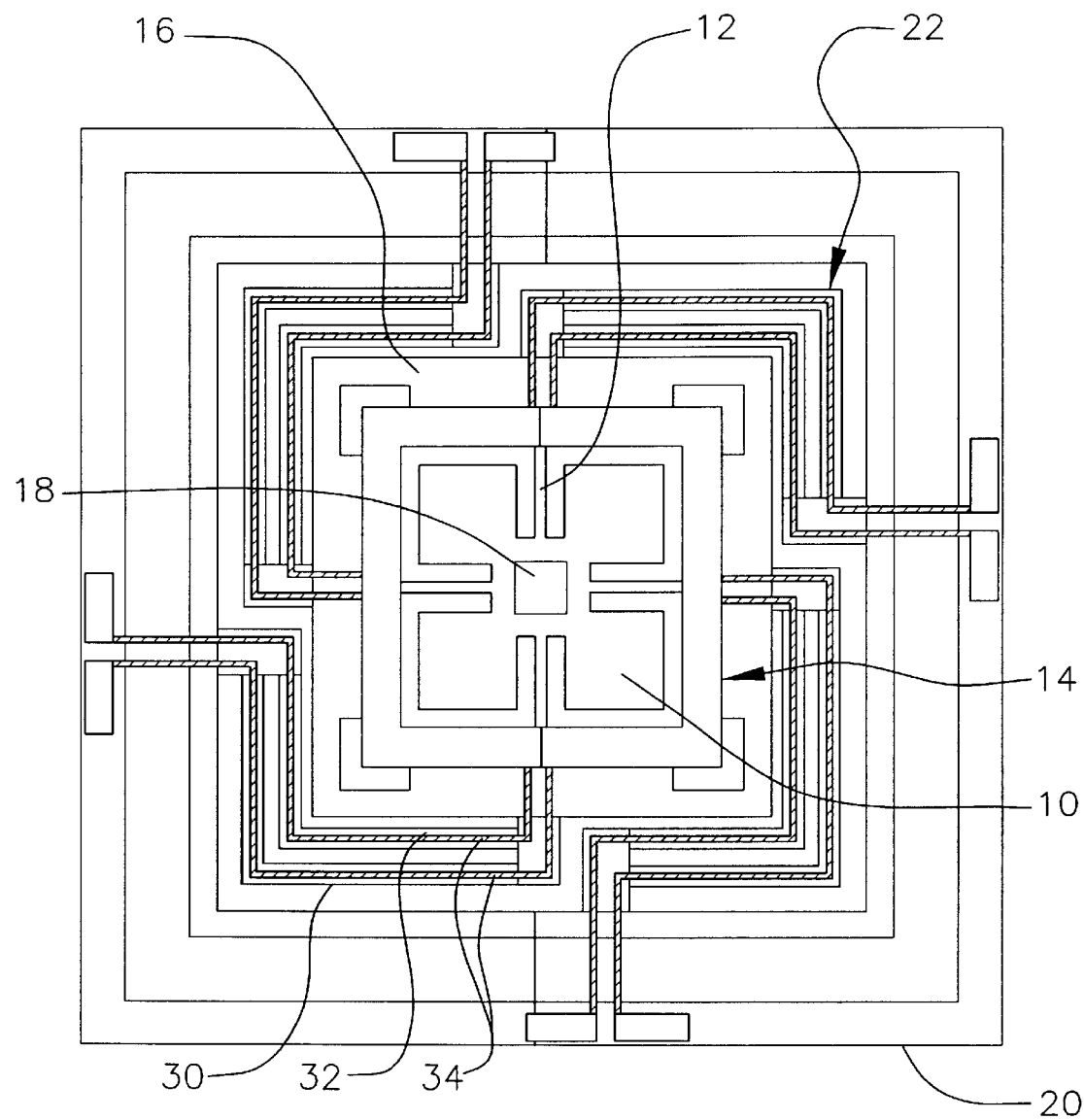
FIG. 2 is a top plan view of a resonator having a spring isolation system according to an alternative embodiment of the present invention.
Figure 8A:
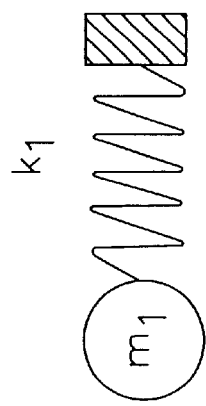
FIG. 8A is a schematic representation of a resonator in which a single movable mass is coupled to a fixed mass by a spring structure.
Figure 8B:
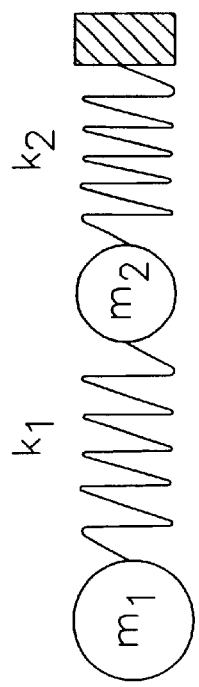
FIG. 8B is a schematic representation of a resonator in which a first movable mass is coupled to a second movable mass by a spring structure, and the second movable mass is coupled to a fixed mass by a second spring structure.
Figure 8C:
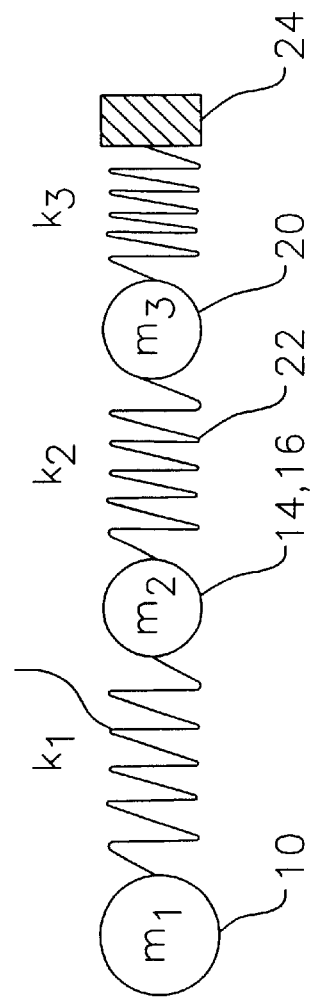
FIG. 8C is a schematic representation of a resonator in which a first movable mass is coupled to a second movable mass by a spring structure, and the second movable mass is coupled to a third movable mass by a second spring structure, and the third movable mass is coupled to a fixed mass by a third spring structure.

The structure of FIG. 2 can be modeled by a system of three movable masses ($m_1$, $m_2$, $m_3$) connected together serially by three springs ($k_1$, $k_2$, $k_3$) with one of the springs disposed between the final mass ($m_3$) in the series and the fixed mass, as depicted in FIG. 8C. The equations of motion for the modeled system are therefore as follows:

$$m_1\ddot{x}_1 + k_1(x_1 - x_2) = D_1 e^{j\omega t}; \tag{6}$$

$$m_2\ddot{x}_2 + k_1(x_2 - x_1) + k_2(x_2 - x_3) = -D_1 e^{j\omega t}; \tag{7}$$

and $$m_3\ddot{x}_3 + k_2(x_3 - x_2) + k_3(x_3) + \gamma_3\dot{x}_3 = 0 \tag{8}$$

where $m_1$ is the proof mass 10, $m_2$ is the mass of the rim 14 and the base plate 16, $m_3$ is the mass of the anchoring base 20, $k_1$ is the spring constant of the springs 12 between the proof mass 10 and the rim 14, $k_2$ is the spring constant of the isolation system 22 between the base plate 16 and the anchoring base 20, and $k_3$ is the spring constant of the material used to anchor the base to the fixed external support structure 24. When solved, these above equations (6–8) yield the following expression for the Q factor of the system of FIG. 1.

$$Q = \frac{2\omega^4 k_2 m_2^2 (k_3 - \omega^2 m_3) + \omega^2 k_2^2 m_2 (-2k_3 + \omega^2 (m_2 + 2m_3)) + (k_2 - \omega^2 m_2)^2 \left((k_3 - \omega^2 m_3)^2 + \omega^2 \gamma_3^2\right)}{2\pi \omega^3 k_2^2 m_1 \gamma_3}$$

Figure 9:
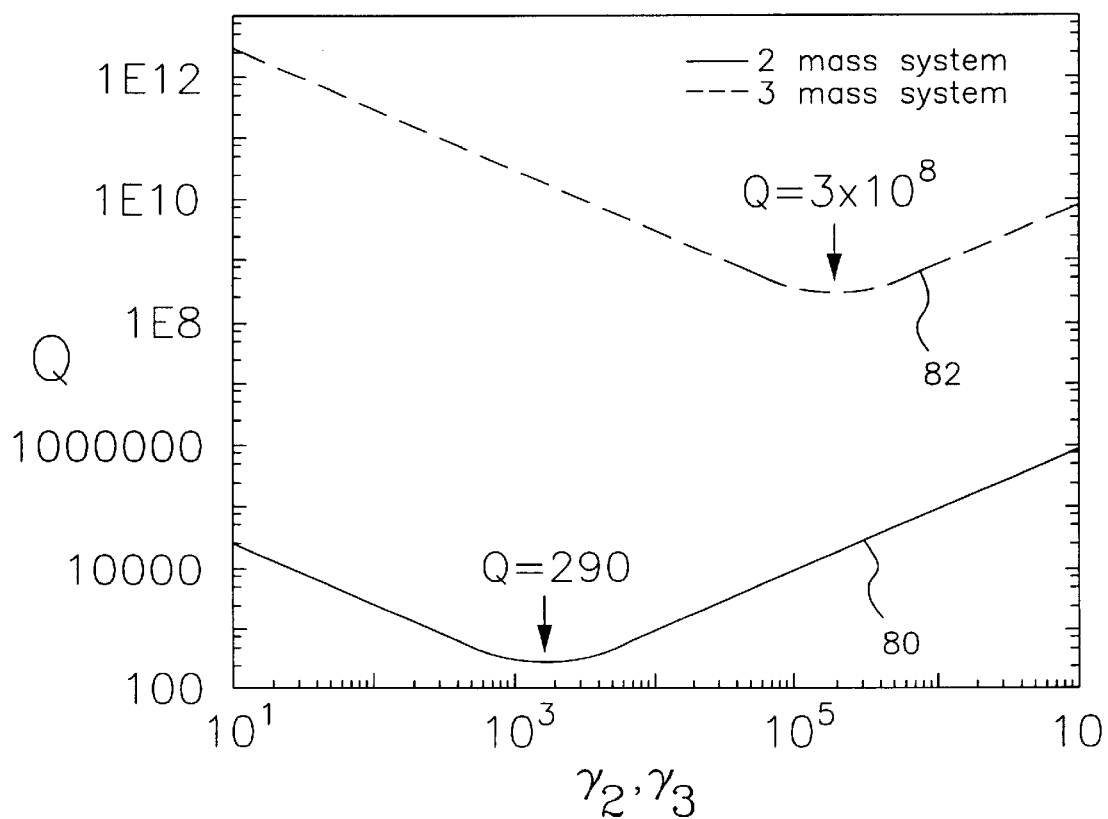
FIG. 9 is a graph comparing the Q values of resonators both with and without a spring isolation system according to the invention.

This expression for the Q factor of a resonator of the present invention is illustrated graphically in FIG. 9 as a curve 82, depicted as a dashed line. The curve 82 is plotted assuming the following typical values for the frequency, relative masses and spring constants of the three-mass system when the resonator is used as a gyroscope:

$\omega = 3000*2\pi$ (the frequency of oscillation is 3 kHz)
$m_1 = 0.0001$
$m_2 = 0.01$
$m_3 = 0.1$
$k_1 = m_1 \omega^2$
$k_2 = m_2 (0.1 \omega)^2$ for the 3-mass system (vibration isolation springs are soft)
$k_3 = m_3 (10 \omega)^2$ for the 3-mass system (the mounting is relatively stiff)

Also illustrated in FIG. 9, for purposes of comparison, is a solid curve 80 representing the Q-factor of the two-mass system of FIG. 8B. Similar values were used in plotting the curve 80, except the spring constant $K_2$ was assumed to be equal to $m_2(10\omega)^2$ because the mounting was assumed to be relatively stiff, as was the third spring mounting ($k_3$) of the three-mass system.

In both cases, the Q's are plotted vs. the damping or loss factor ($\gamma$) inherent in the mounting method. The precise loss factor is very difficult to control, but it is assumed that the actual Q's will be close to the minimums of the curves, i.e., a few hundred for the two-mass system (curve 80) and a few hundred million for the three-mass system (curve 82).

Comparing the curves 80 and 82, it can be seen that the isolation system 22 between the base plate 16 and the anchoring base 20 dramatically improves the Q-factor of a resonator over prior systems in which springs supporting a proof mass are soldered, adhered, or otherwise firmly affixed to a stationary external supporting structure. Taking the minimum values as a worse-case scenario, the Q-factor of the illustrated resonator is higher than the Q-factor of a resonator of the prior design by a factor of $10^6$.

Thus, the present invention provides a way to isolate a resonator by incorporating an additional spring system whose parameters can be controlled to enhance the resonant characteristics of the larger system. This effectively isolates the vibrating proof mass 10 from the solder, glue, or other substance used to attach the resonator to the external support structure, thereby reducing the damping effect of the attaching substance. The result is a substantially higher Q-factor and a corresponding increase in the sensitivity of the instrument of which the resonator is a part.

One use of the resonator of the present invention is in a gyroscope, accelerometer or other form of sensor, as explained in U.S. Pat. No. 5,894,090, titled "Silicon Bulk Micromachined, Symmetric, Degenerate Vibratory Gyroscope, Accelerometer And Sensor And Method For Using Same", and U.S. patent application Ser. No. 09/502403, entitled "Inertial Sensor And Method Of Use", the contents of which are hereby incorporated by reference in their entirety. Inertial sensors of this type typically have a resonating element in the form of a proof mass suspended from a rim by spring structures constructed to have a given vibrational mode. Drive circuitry rocks the proof mass about a rocking axis which passes through its defined center, and bias circuitry supplies a voltage to modify the mode shape. Sensing circuitry measures acceleration and/or rotation by detecting changes of the mode shape of the vibrating proof mass. Output circuitry generates a signal indicating acceleration on a specific degree of rotation.

Other resonating structures, both symmetrical and non-symmetrical, can be substituted for the proof mass structure of FIG. 1. Also, the proof mass 10, the springs 12 and the rim 14 of the resonator of FIG. 2 can all be made of a monolithic, micromachined body of crystalline silicon or other suitable material. In addition, the base plate 16, the isolation spring system 22, and the anchoring base 20, can all be formed from a single, monolithic body of crystalline silicon, quartz, or other suitable material, utilizing any of a variety of well-known patterning techniques. By way of example, but not limitation, such techniques include plasma etching, reactive ion etching, wet etching and laser processing. Alternatively, any of the listed bodies can be fabricated from a plurality of discrete components joined together to have the desired vibrational and conductive characteristics. In any case, the base plate 16, the isolation spring system 22 and the anchoring base 20 typically include metallized surface regions providing paths for electrical signals passing between the base plate and the anchoring base to drive the proof mass and convey sensed information.

Many alternative embodiments of the resonator are envisioned with different configurations of the spring isolation system of the present invention, a few of which will now be discussed. As described above, FIG. 1 illustrates a spring isolation system 22 having four unitary springs 26, each of which originates in the middle of one side of the square base plate 16. Each spring has a pair of principal legs 28 extending substantially parallel to the adjoining sides of the base plate 16.

An alternative embodiment, shown in FIG. 2, is similar to the embodiment of FIG. 1 but has two separate spring elements, 30 and 32, which are parallel to each other, in place of such spring element 26 of FIG. 1. Also shown in FIG. 2 are electrical leads 34, similar to the leads described in conjunction with FIG. 1, on top of 30 and 32, and parallel to them.

Figure 3:
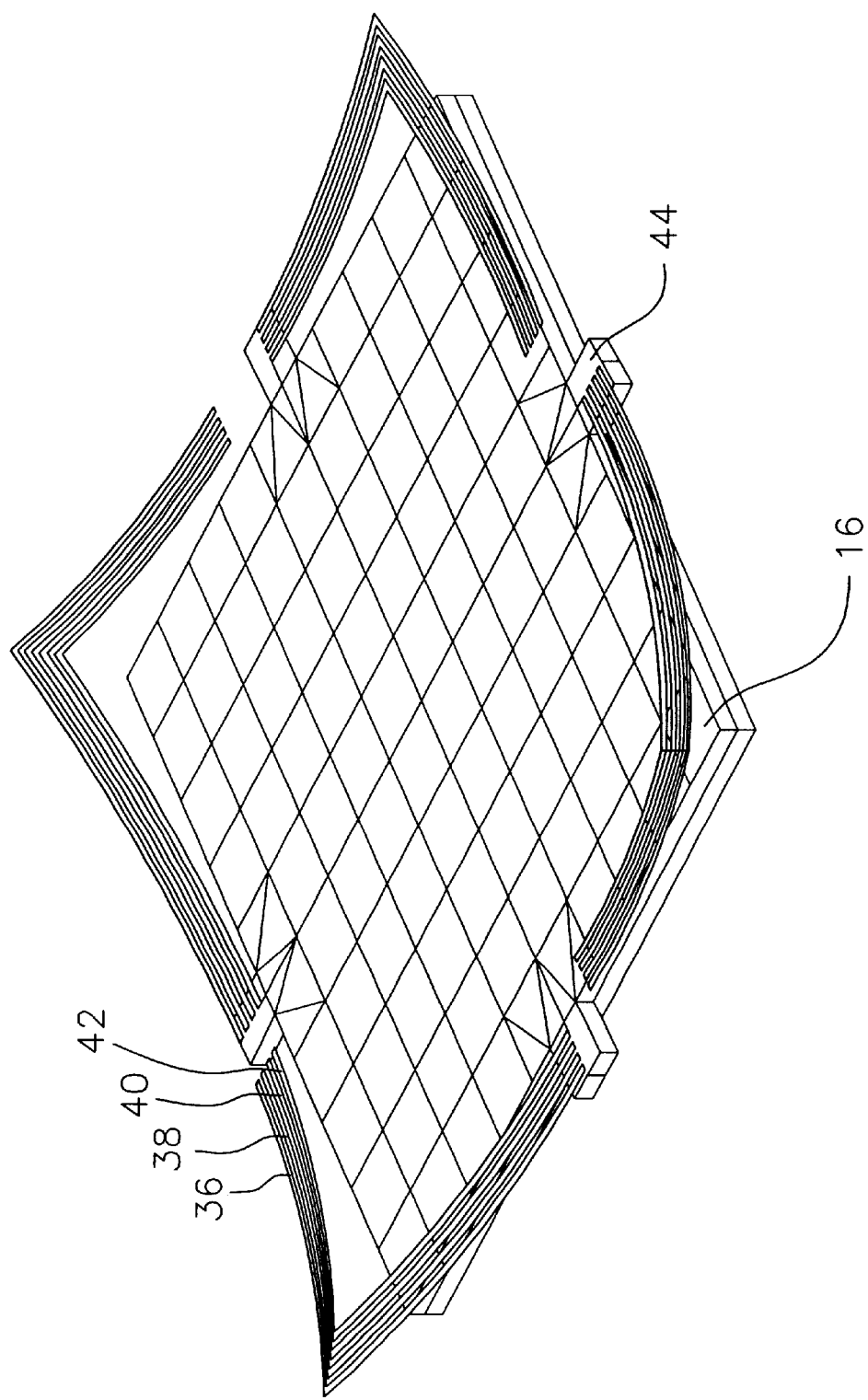
FIG. 3 is a somewhat diagrammatic perspective view of a resonator having a spring isolation system according to another embodiment of the present invention.

Another alternative embodiment, illustrated in FIG. 3, is also similar to the embodiment of FIG. 1 but has four parallel spring elements, 36–42, in place of each spring element 26 of FIG. 1. Each set of four parallel spring elements has one 90 degree bend and is attached to a projection 44 at the center of one side of the base plate 16.

Figure 4:
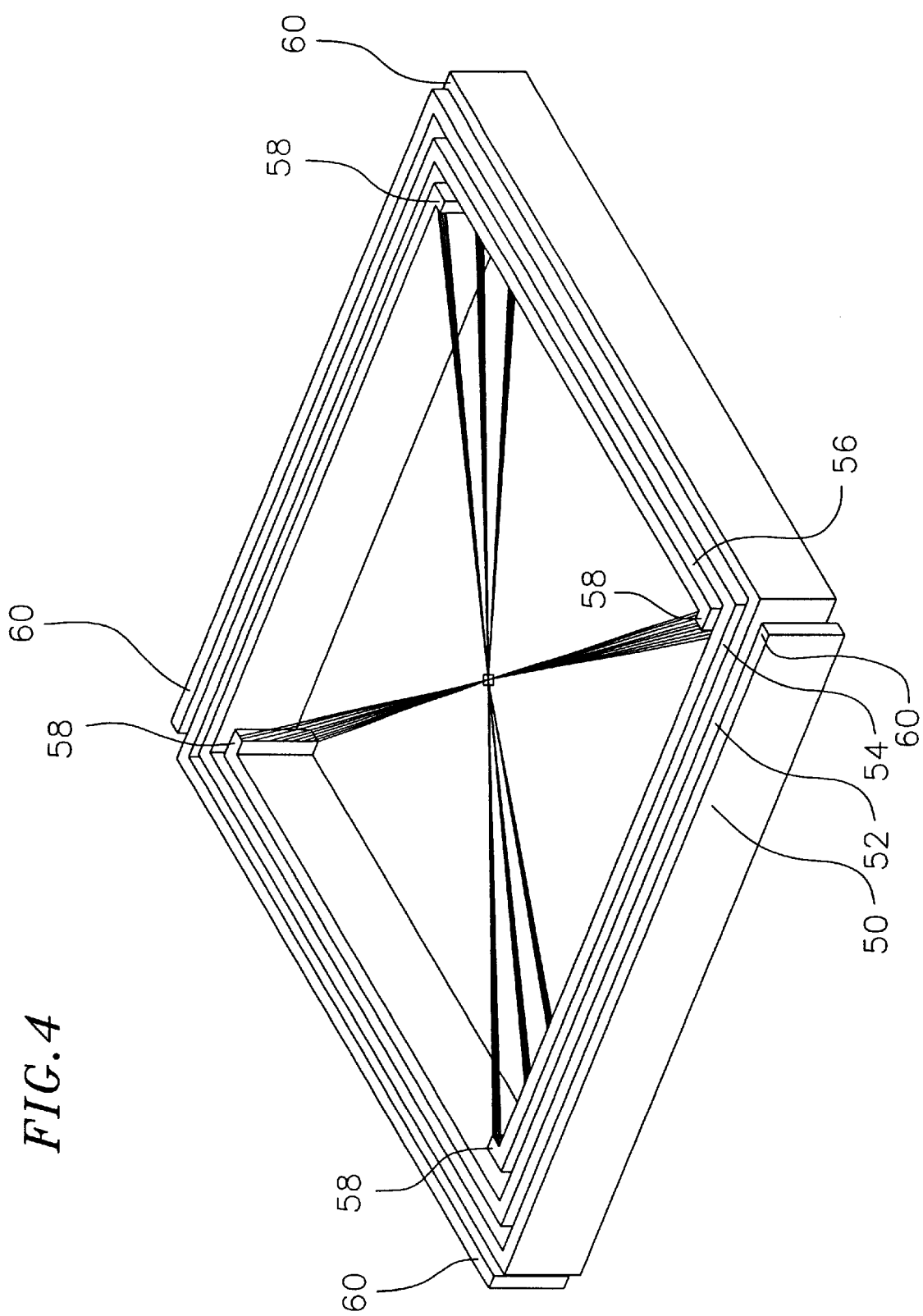
FIG. 4 is a diagrammatic perspective view of a resonator having a spring isolation system according to yet another embodiment of the present invention.

FIG. 4 shows only a series of spring elements 50, 52, 54 and 56 of an additional embodiment of the present invention. These four spring elements are nested with each other and extend from first ends 58 that connect to respective corners of the base plate 16 of a resonator (not shown), and a second end 60 that connects to a corner of the anchoring base 20 (not shown). Each spring element attaches to the base plate 16, extends parallel to three sides of the base plate 16, and then attaches to the anchoring base 20. This configuration provides four separate isolation springs, but is also relatively compact.

Figure 5:
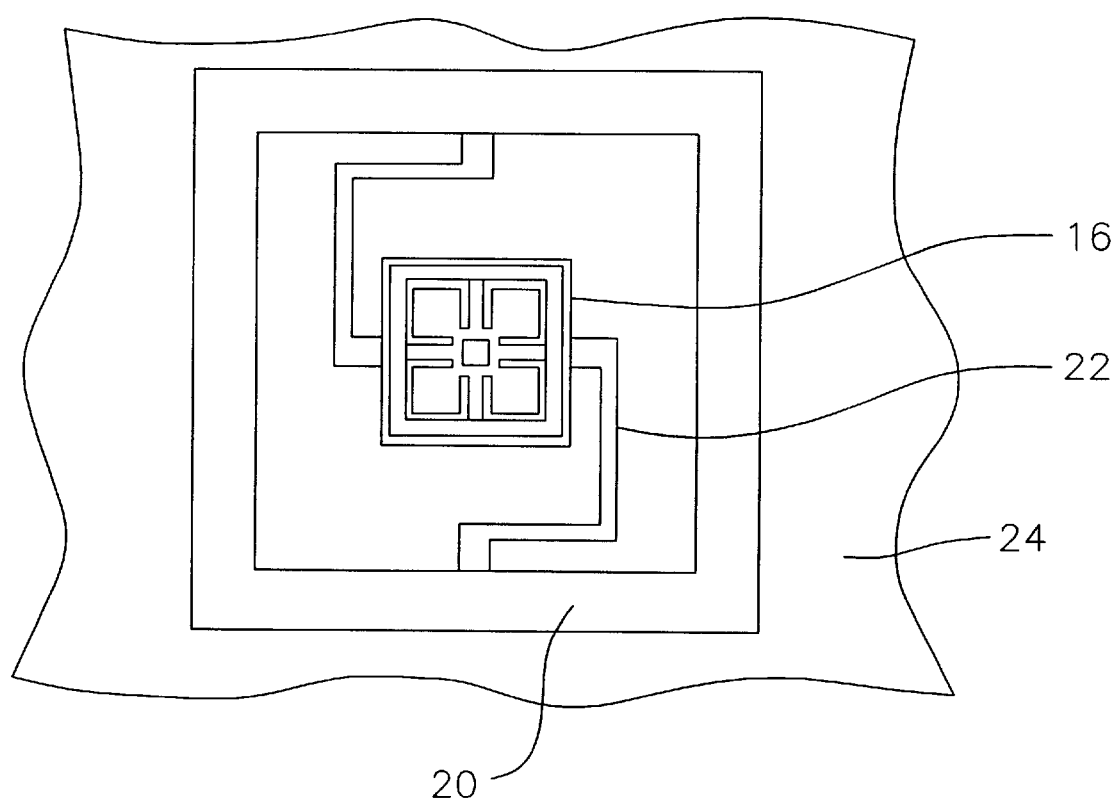
FIG. 5 is a top plan view of a resonator having a spring isolation system according to a further embodiment of the present invention.

FIG. 5 illustrates an embodiment of the resonator of the invention having only two spring elements 22 in the spring isolation system. The two spring elements 22 are identical to the corresponding elements of the embodiment of FIG. 1, and attach to opposite sides of the resonator base plate 16.

Figure 6:
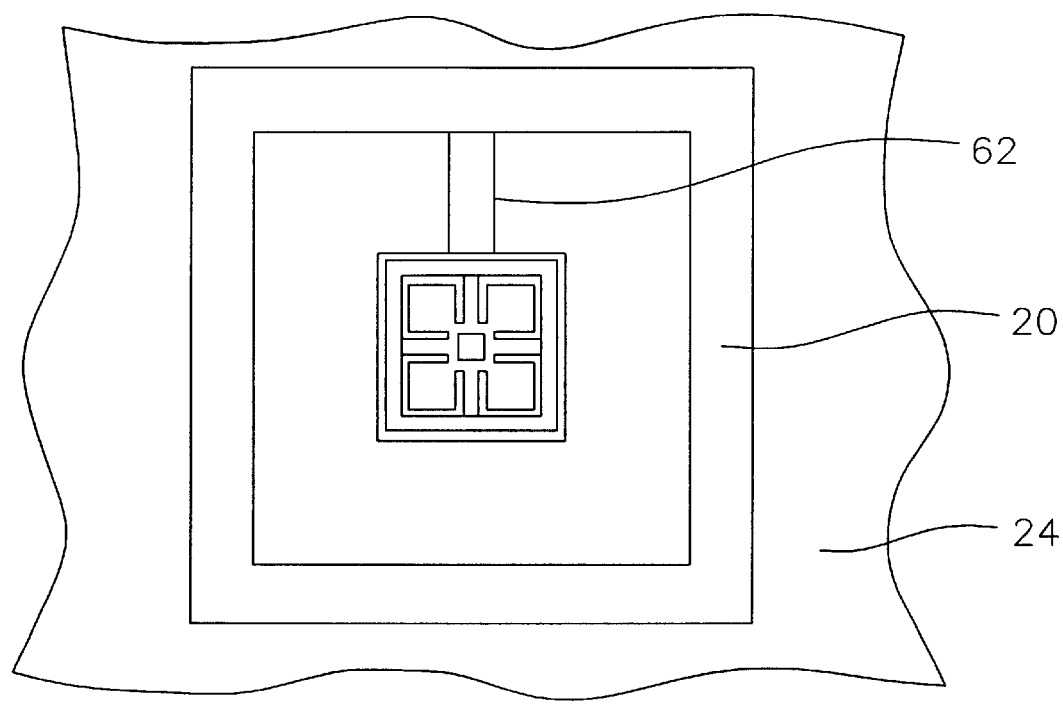
FIG. 6 is a top plan view of a resonator having a spring isolation system according to a still further embodiment of the present invention.

FIG. 6 depicts a somewhat different embodiment having a single spring element 62 extending directly from the middle of one side of the square base plate 16 to the middle of the closest side of the square anchoring base 20.

Figure 7:
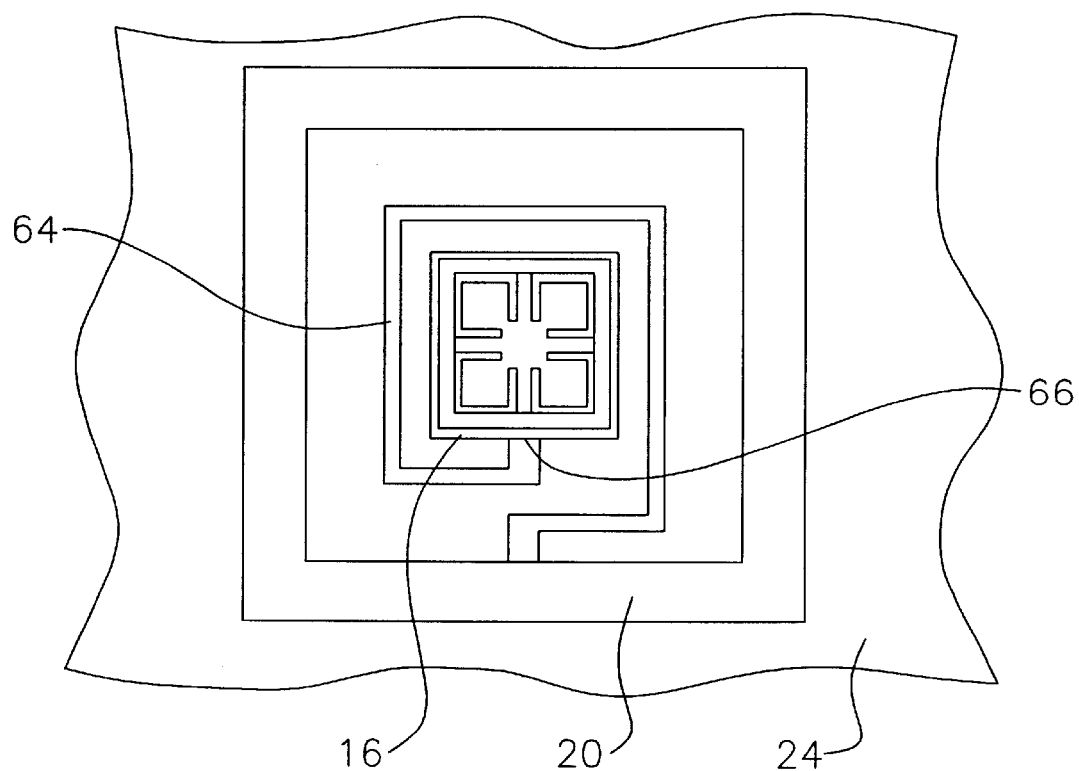
FIG. 7 is a schematic top plan view of a resonator having a spring isolation system according to a still further embodiment of the present invention.

FIG. 7 shows yet another embodiment of the invention having a single spring element 64 connected to the base plate 16 of a resonator. A first end 66 of the spring element is connected to the center of one side of the square base plate 16. From the end 66, the spring element extends entirely around the outside of the base plate 16, remaining parallel to the sides of the base plate, and joins the anchoring base 20 at a side of the anchoring base corresponding to the side of the base plate 16 to which the spring element 64 is attached.

In a further embodiment, the spring element(s) between the base plate 16 and the anchoring base 20 may be a semi-continuous membrane. Additionally, the spring element may consist of both passive micromachined elements and active controls having electrical components that vary the amount of damping in response to the sensed behavior of the resonator. In an additional embodiment, the anchoring base 20 can be connected to one or more additional bases and the spring isolation system can be connected to the one or more additional bases. In another embodiment, the spring isolation system may connect to an external mass, and that external mass may have one or more additional spring isolation systems attaching the anchoring base 20 to another external mass. In such cases, the presence of a spring isolation system attached to the base causes any uncontrollable changes in the damping of the external mass coupling, caused by glue or solder for example, to be lower than it otherwise would be.

The shape and composition of the spring elements 22 are also variable to control the rigidity and damping of the isolation system. The locations of attachment to the base plate 16 and the anchoring base 20 are also variable to alter rigidity and balance. The preceding description has been presented with reference to the presently preferred embodiments of the invention shown in the drawings. Workers skilled in the art and technology to which this invention pertains will appreciate that alteration and changes in the described processes and structures can be practiced without departing from the spirit, principles and scope of this invention. The scope of the invention is to be determined by the claims supported by this application and their equivalents, rather than the foregoing description.

What is claimed is:

1. A micromachined resonator mountable to an external support structure comprising:
    a proof mass suspended by a first spring structure;
    a base structure to which the proof mass is coupled, the base structure including a plurality of electrodes; and
    a second spring structure coupling the base structure to the external support structure.

2. A micromachined resonator according to claim 1 wherein the second spring structure comprises a micromachined spring.

3. A micromachined resonator according to claim 1 wherein:
    the base structure comprises a rectangular frame; and
    the second spring structure comprises two micromachined springs coupling opposite sides of the base structure to the external support structure.

4. A micromachined resonator according to claim 1 wherein:
    the base structure comprises a rectangular frame; and
    the second spring structure comprises two micromachined springs coupling adjacent sides of the base structure to the external support structure.

5. A micromachined resonator according to claim 1 wherein:
    the base structure comprises a rectangular frame; and
    the second spring structure comprises at least four micromachined springs coupling each of the four sides of the base structure to an external support structure.

6. A micromachined resonator according to claim 1 wherein:
    the base structure comprises a rectangular frame;
    the second spring structure comprises one micromachined spring coupling the center of one side of the base structure to the external support structure.

7. A micromachined resonator according to claim 1 wherein:
    the second spring structure comprises at least one spring element set having at least two micromachined spring elements substantially parallel to each other coupling the base structure to the external support structure.

8. A micromachined resonator according to claim 2 further comprising electric lead wires coupled to the micromachined spring of the second spring structure.

9. A micromachined resonator according to claim 1 wherein:
    the base structure comprises a rectangular frame;
    the second spring structure comprises four micromachined springs wherein:
        each spring structure is coupled at a first end to a corner of the base structure; and
        each spring is positioned around three sides of the base structure; and
        each spring is coupled at a second end to the external support structure.

10. A micromachined resonator according to claim 1 wherein the second spring structure comprises a membrane.

11. A micromachined resonator according to claim 1 wherein the plurality of electrodes comprises:
    drive circuitry for exciting a mode of the proof mass having a mode shape;
    bias circuitry for supplying a voltage to modify the mode shape;
    sensing circuitry for measuring acceleration by detecting a change of the mode shape of the proof mass; and
    output circuitry for outputting a signal indicating the acceleration.

12. A micromachined resonator according to claim 1 wherein the plurality of electrodes comprises:
    drive circuitry for exciting a mode of the proof mass having a mode shape;
    bias circuitry for supplying a voltage to modify the mode shape;
    sensing circuitry for measuring rotation by detecting a change of the mode shape of the proof mass; and
    output circuitry for outputting a signal indicating the rotation.

* * * * *